(12) United States Patent
Bittar et al.

(10) Patent No.: US 11,339,650 B2
(45) Date of Patent: May 24, 2022

(54) COMPACT LOGGING WHILE DRILLING LOOK AROUND AND LOOK AHEAD TOOL

(71) Applicant: Halliburton Energy Services, Inc., Houston, TX (US)

(72) Inventors: Michael Bittar, Houston, TX (US); Jin Ma, Houston, TX (US); Alexei Korovin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 16/361,761

(22) Filed: Mar. 22, 2019

(65) Prior Publication Data

US 2020/0300084 A1 Sep. 24, 2020

(51) Int. Cl.
| | | |
|---|---|---|
| *E21B 49/00* | (2006.01) | |
| *E21B 47/12* | (2012.01) | |
| *G05B 15/02* | (2006.01) | |
| *E21B 49/08* | (2006.01) | |

(52) U.S. Cl.
CPC .............. *E21B 49/00* (2013.01); *G05B 15/02* (2013.01); *E21B 47/12* (2013.01); *E21B 49/08* (2013.01)

(58) Field of Classification Search
CPC ................................. E21B 49/00; E21B 47/12
See application file for complete search history.

(56) References Cited

U.S. PATENT DOCUMENTS

| | | | |
|---|---|---|---|
| 6,566,881 B2 | 5/2003 | Omeragic et al. | |
| 8,736,270 B2* | 5/2014 | Seydoux | G01V 3/28 324/338 |
| 9,310,511 B2* | 4/2016 | Itskovich | G01V 3/38 |
| 11,035,976 B2* | 6/2021 | Hou | E21B 47/12 |
| 2004/0262013 A1* | 12/2004 | Tilton | E21B 17/025 166/380 |

(Continued)

FOREIGN PATENT DOCUMENTS

| | | |
|---|---|---|
| WO | 2017065722 | 4/2017 |
| WO | 2018094083 | 5/2018 |

OTHER PUBLICATIONS

International Search Report and Written Opinion for Application No. PCT/US2020/019751, dated Jun. 19, 2020.

(Continued)

*Primary Examiner* — Reena Aurora
(74) *Attorney, Agent, or Firm* — Benjamin Ford; C. Tumey Law Group PLLC

(57) ABSTRACT

A compact sub assembly and well measurement system. The compact sub assembly may comprise a deep transmitter disposed about one end of the compact sub assembly, a shallow dual transmitter disposed on the compact sub assembly between the deep transmitter and a second end of the compact sub assembly, a shallow dual-collocated receiver disposed on the compact sub assembly between the deep transmitter and a second end of the compact sub assembly, and a deep receiver disposed about the second end of the compact sub assembly. A well measurement system for decoupling a component signal may comprise a logging tool. The logging tool may comprise a first sub assembly and a conveyance attached to the logging tool. In examples the first sub assembly is a compact sub assembly comprising a deep transmitter, a shallow dual transmitter, a shallow dual-collocated receiver, and a deep receiver.

20 Claims, 7 Drawing Sheets

(56) References Cited

U.S. PATENT DOCUMENTS

| | | |
|---|---|---|
| 2011/0074427 A1 | 3/2011 | Wang et al. |
| 2012/0249149 A1 | 10/2012 | Bittar et al. |
| 2013/0144529 A1 | 6/2013 | Seydoux et al. |
| 2013/0248250 A1 | 9/2013 | Bittar et al. |
| 2015/0276968 A1 | 10/2015 | Frey |
| 2017/0306701 A1 | 10/2017 | Wu et al. |
| 2020/0300085 A1* | 9/2020 | Hensarling ............. E21B 49/00 |

OTHER PUBLICATIONS

Schlumberger, GeoSphere—Reservoir Mapping-While-Drilling Service, Schlumberger, 2018.
Halliburton, ADR™ Azimuthal Deep Resistivity Sensor, Logging-While-Drilling Services, H05629, Mar. 2016.
PCT Application No. PCT/US2018/051029 dated Sep. 14, 2018.
PCT Application No. PCT/US2018/051024 dated Sep. 14, 2018.
Halliburton, Sperry Drilling, Earthstar Ultra-Deep Resistivity Service, Maximize Asset Value Through Geostopping, Geosteering, and Geomapping, H013109, Feb. 2019.

* cited by examiner

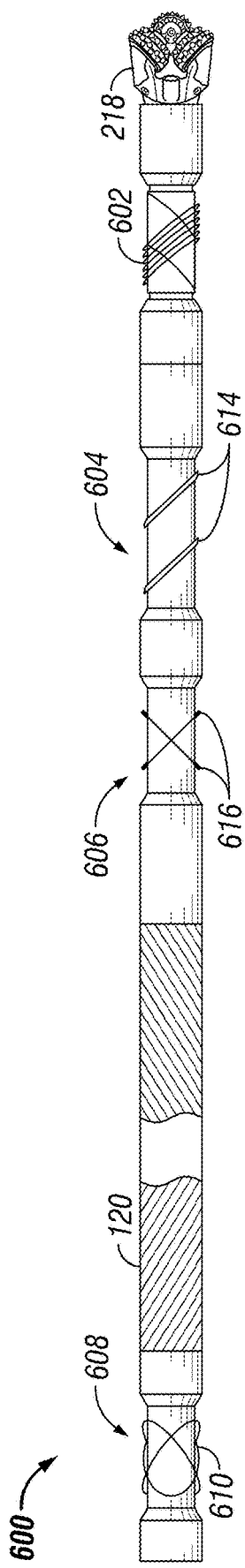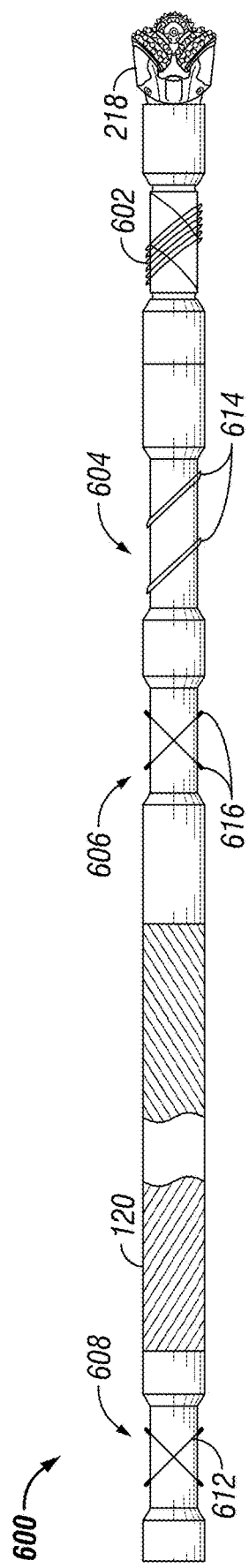
FIG. 6
FIG. 7

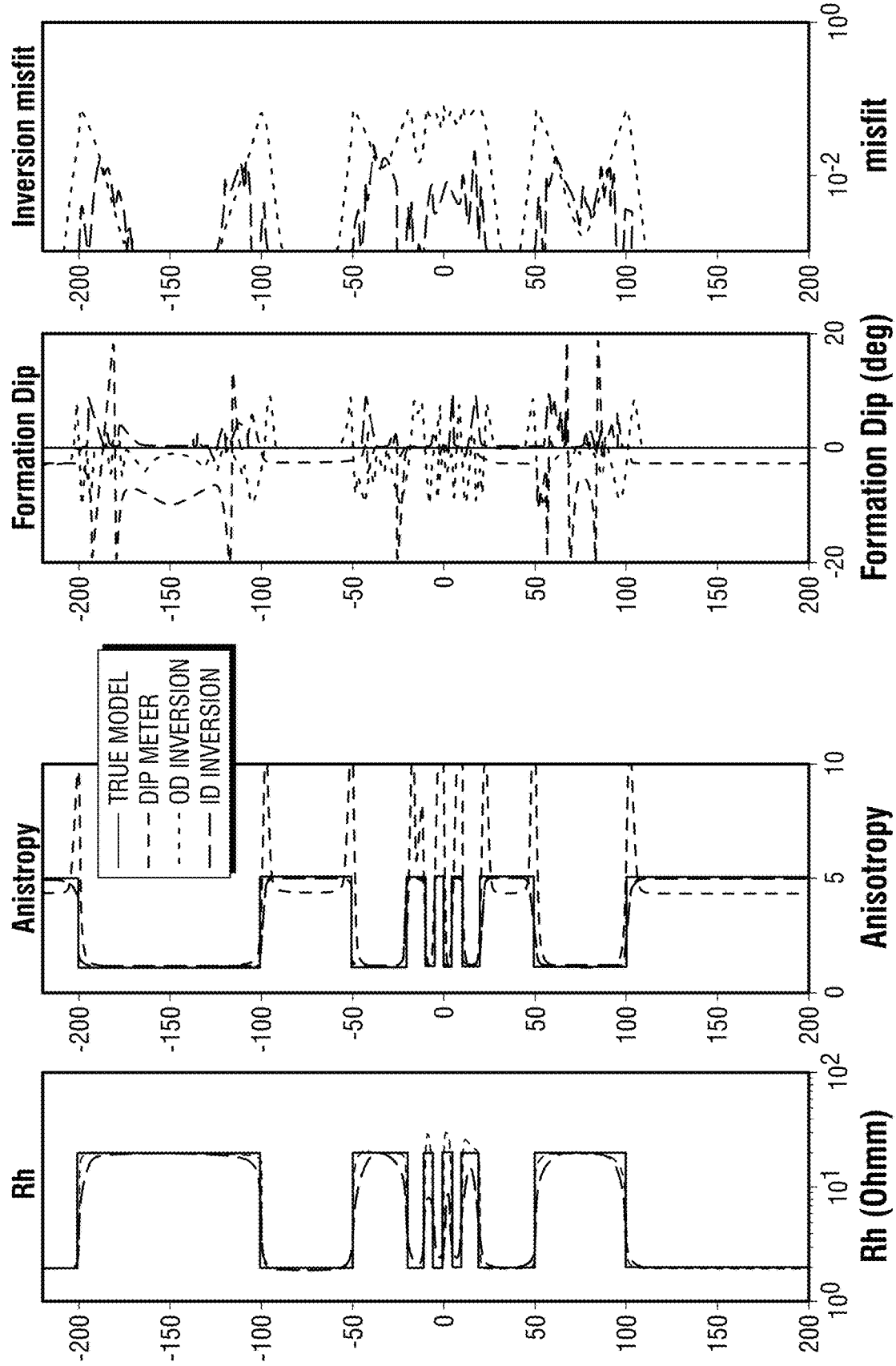

US 11,339,650 B2

COMPACT LOGGING WHILE DRILLING LOOK AROUND AND LOOK AHEAD TOOL

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. As measurements from deeper formation away from the wellbores are more and more essential for reservoir exploration, logging tools may become longer and more sophisticated. Measurements by antennas on the logging tool may provide information that may allow an operator to determine wellbore and/or formation properties. However, a logging tool may stretch over a large area and further include large spacing and increased mechanical variance between antennas, wherein the antennas may include transmitters and receivers, such tool configurations introduce high-expenses in making the tool. Additionally, increasing length between sub-assemblies of the logging tool creates communication issues between transmitter subs and receiver subs, which may result in unreliable services for real-time operations. Finally, the long spacing in between transmitter and receivers prevents measurements of anisotropy and formation dip angle on a fine scale, which also in turn prevents reliable "look ahead" ability in front of a drilling bit during drilling operations, as the "look ahead" capability needs fine formation constraints behind the drilling bit.

BRIEF DESCRIPTION OF THE DRAWINGS

These drawings illustrate certain aspects of some examples of the present disclosure and should not be used to limit or define the disclosure.

FIG. 6 illustrates an example compact sub assembly of the logging tool with a deep triad receiver;

FIG. 7 illustrates an example compact sub assembly of the logging tool with a deep dual-collocated receiver;

FIG. 8 is an example graph of horizontal resistivity measurements of the compact sub assembly;

FIG. 9 is an example graph of anisotropy measurements of the compact sub assembly;

FIG. 10 is an example graph of formation dip measurements of the compact sub assembly;

FIG. 11 is an example graph of inversion misfit measurements of the compact sub assembly.

DETAILED DESCRIPTION

The present disclosure relates generally to a compact sub assembly that may increase the capability of logging tools to look ahead of a drill bit during drilling operations. Increasing look ahead capabilities may allow an operator to steer a drill string with knowledge of the formation in front of the drill bit. As discussed below, a logging tool may include any number of downhole sub-assemblies, which may include antennas (e.g., transmitter and/or receiver antennas). A compact design of the logging tool may move receiver and transmitter antennas closer together, which may stabilize communication between sub-assemblies and may allow for anisotropy measurements and formation dip measurements on a fine scale.

Figure 1:
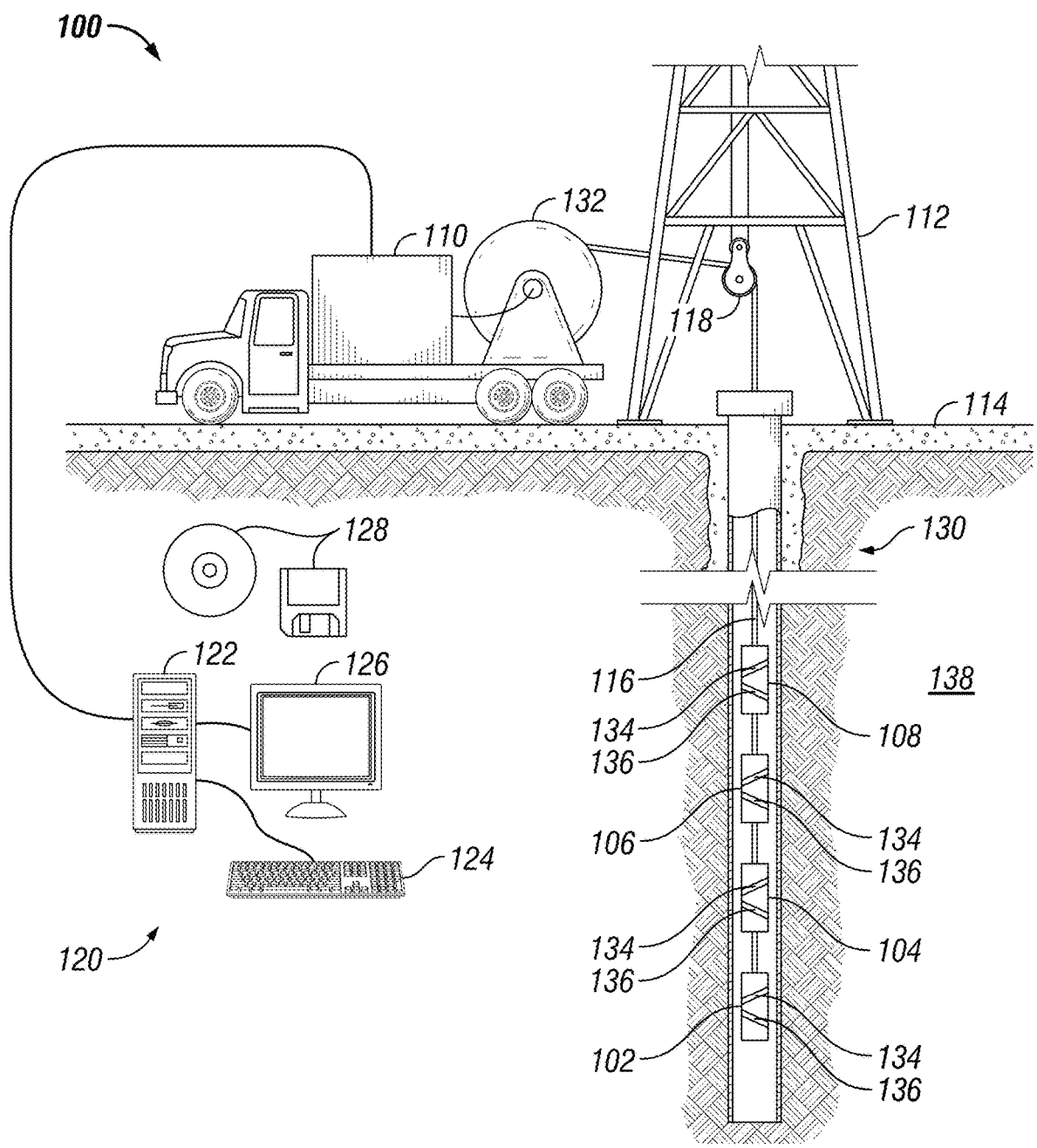
FIG. 1 illustrate an example of a well measurement system.

FIG. 1 illustrates a cross-sectional view of a well measurement system 100. As illustrated, well measurement system 100 may include a first sub assembly 102, a second sub assembly 104, a third sub assembly 106, and/or a fourth sub assembly 108. Each sub assembly may work together as a logging tool. It should be noted that well measurement system 100 may include only first sub assembly 102. As illustrated, first sub assembly 102, second sub assembly 104, third sub assembly 106, and/or fourth sub assembly 108 may attach to a vehicle 110. In examples, it should be noted that first sub assembly 102, second sub assembly 104, third sub assembly 106, and/or fourth sub assembly 108 may not be attached to a vehicle 110. First sub assembly 102, second sub assembly 104, third sub assembly 106, and/or fourth sub assembly 108 may be supported by rig 112 at surface 114. First sub assembly 102, second sub assembly 104, third sub assembly 106, and/or fourth sub assembly 108 may be tethered to vehicle 110 through conveyance 116. Conveyance 116 may be disposed around one or more sheave wheels 118 to vehicle 110. Conveyance 116 may include any suitable means for providing mechanical conveyance for first sub assembly 102, second sub assembly 104, third sub assembly 106, and/or fourth sub assembly 108, including, but not limited to, wireline, slickline, coiled tubing, pipe, drill pipe, downhole tractor, or the like. In some embodiments, conveyance 116 may provide mechanical suspension, as well as electrical connectivity, for first sub assembly 102, second sub assembly 104, third sub assembly 106, and/or fourth sub assembly 108. Conveyance 116 may include, in some instances, a plurality of electrical conductors extending from vehicle 110. Conveyance 116 may include an inner core of several electrical conductors covered by an insulating wrap. An inner and outer steel armor sheath may be wrapped in a helix in opposite directions around the conductors. The electrical conductors may be used for communicating power and telemetry between vehicle 110 and first sub assembly 102, second sub assembly 104, third sub assembly 106, and/or fourth sub assembly 108. Information from first sub assembly 102, second sub assembly 104, third sub assembly 106, and/or fourth sub assembly 108 may be gathered and/or processed by information handling system 120. For example, signals recorded by first sub assembly 102, second sub assembly 104, third sub assembly 106, and/or fourth sub assembly 108 may be stored on memory and then processed by first sub assembly 102, second sub assembly 104, third sub assembly 106, and/or fourth sub assembly 108. The processing may be performed real-time during data acquisition or after recovery of first sub assembly 102, second sub assembly 104, third sub assembly 106, and/or fourth sub assembly 108. Processing may alternatively occur downhole or may occur both downhole and at surface. In some embodiments, signals recorded by first sub assembly 102, second sub assembly 104, third sub assembly 106, and/or fourth sub assembly 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first sub assembly 102, second sub assembly 104, third sub assembly 106, and/or fourth sub assembly 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may include a safety valve which controls the hydraulic pressure that drives drum 132 on vehicle 110 which may reel up and/or release conveyance 116 which may move first sub assembly 102, second sub assembly 104, third sub assembly 106, and/or fourth sub assembly 108 up and/or down wellbore 130. The safety valve may be adjusted to a pressure such that drum 132 may only impart a small amount of tension to conveyance 116 over and above the tension necessary to retrieve conveyance 116 and/or first sub assembly 102, second sub assembly 104, third sub assembly 106, and/or fourth sub assembly 108 from wellbore 130. The safety valve is typically set a few hundred pounds above the amount of desired safe pull on conveyance 116 such that once that limit is exceeded; further pull on conveyance 116 may be prevented.

In examples, first sub assembly 102, second sub assembly 104, third sub assembly 106, and/or fourth sub assembly 108 may include a transmitter 134 and/or a receiver 136. It should be noted that transmitter 134, receiver 136, a plurality of transmitters, a plurality of receivers, a plurality of antennas, and/or any combination thereof may be referred to as an antenna and/or a collocated antenna. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from formation 138. During operations, transmitter 134 may broadcast a signal from first sub assembly 102, second sub assembly 104, third sub assembly 106, and/or fourth sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130, fluids, and/or formation 138.

Figure 2:
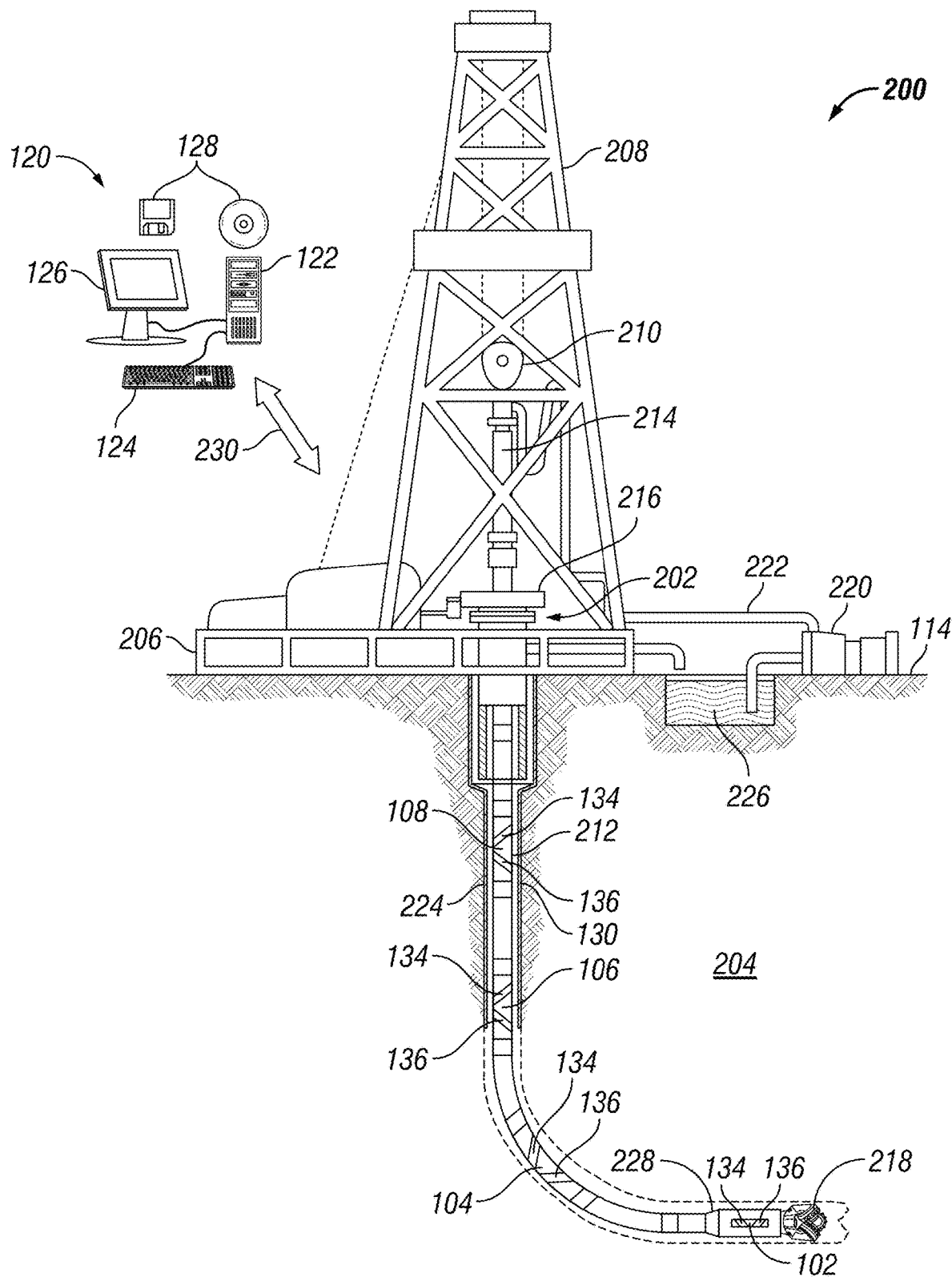
FIG. 2 illustrates another example of a well measurement system.

FIG. 2 illustrates an example in which first sub assembly 102, second sub assembly 104, third sub assembly 106, and/or fourth sub assembly 108 (e.g., Referring to FIG. 1) may be disposed in a drilling system 200. As illustrated, wellbore 130 may extend from a wellhead 202 into a subterranean formation 204 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may include a metallic material. By way of example, the metallic member may be a casing, liner, tubing, or other elongated steel tubular disposed in wellbore 130.

As illustrated in FIG. 2, wellbore 130 may extend through subterranean formation 204. Without limitation, wellbore 130 may extending generally vertically into the subterranean formation 204, however wellbore 130 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 130 that penetrates various subterranean formations 204. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further include first sub assembly 102 (e.g., Referring to FIG. 1). First sub assembly 102 may be disposed on the outside and/or within bottom hole assembly 228. It should be noted that second sub assembly 104, third sub assembly 106, and/or fourth sub assembly 108 may be disposed on drill string 212. Second sub assembly 104, third sub assembly 106, and/or fourth sub assembly 108 may be disposed on the outside and/or within drill string 212. First sub assembly 102, second sub assembly 104, third sub assembly 106, and/or fourth sub assembly 108 may include a transmitter 134 and/or a receiver 136 (e.g., Referring to FIG. 1). It should be noted that first sub assembly 102, second sub assembly 104, third sub assembly 106, and/or fourth sub assembly 108 may include a plurality of transmitters 134 and/or receivers 136. Transmitters 134 and/or receivers 136 may operate and/or function as described above. As will be appreciated by those of ordinary skill in the art, first sub assembly 102, second sub assembly 104, third sub assembly 106, and/or fourth sub assembly 108 may be a measurement-while drilling (MWD) or logging-while-drilling (LWD) system.

Without limitation, first sub assembly 102, second sub assembly 104, third sub assembly 106, and/or fourth sub assembly 108, transmitters 134, and/or receiver 136 may be connected to and/or controlled by information handling system 120 (e.g., Referring to FIG. 1), which may be disposed on surface 114. Without limitation, information handling system 120 may be disposed down hole in first sub assembly 102, second sub assembly 104, third sub assembly 106, and/or fourth sub assembly 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first sub assembly 102, second sub assembly 104, third sub assembly 106, and/or fourth sub assembly 108 may be brought to surface 114. In examples, information handling system 120 may communicate with first sub assembly 102, second sub assembly 104, third sub assembly 106, and/or fourth sub assembly 108 through a communication line (not illustrated) disposed in (or on) drill string 212. In examples, wireless communication may be used to transmit information back and forth between information handling system 120 and first sub assembly 102, second sub assembly 104, third sub assembly 106, and/or fourth sub assembly 108. Information handling system 120 may transmit information to first sub assembly 102, second sub assembly 104, third sub assembly 106, and/or fourth sub assembly 108 and may receive as well as process information recorded by first sub assembly 102, second sub assembly 104, third sub assembly 106, and/or fourth sub assembly 108. In examples, a downhole information handling system (not illustrated) may include, without limitation, a microprocessor or other suitable circuitry, for estimating, receiving and processing signals from first sub assembly 102, second sub assembly 104, third sub assembly 106, and/or fourth sub assembly 108. Downhole information handling system (not illustrated) may further include additional components, such as memory, input/output devices, interfaces, and the like. In examples, while not illustrated, first sub assembly 102, second sub assembly 104, third sub assembly 106, and/or fourth sub assembly 108 may include one or more additional components, such as analog-to-digital converter, filter and amplifier, among others, that may be used to process the measurements of first sub assembly 102, second sub assembly 104, third sub assembly 106, and/or fourth sub assembly 108 before they may be transmitted to surface 114. Alternatively, raw measurements from first sub assembly 102, second sub assembly 104, third sub assembly 106, and/or fourth sub assembly 108 may be transmitted to surface 114.

Any suitable technique may be used for transmitting signals from first sub assembly 102, second sub assembly 104, third sub assembly 106, and/or fourth sub assembly 108 to surface 114, including, but not limited to, wired pipe telemetry, mud-pulse telemetry, acoustic telemetry, and electromagnetic telemetry. While not illustrated, first sub assembly 102, second sub assembly 104, third sub assembly 106, and/or fourth sub assembly 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first sub assembly 102, second sub assembly 104, third sub assembly 106, and/or fourth sub assembly 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First sub assembly 102, second sub assembly 104, third sub assembly 106, and/or fourth sub assembly 108 may include a transmitter 134 and/or a receiver 136. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from subterranean formation 204. During operations, transmitter 134 may broadcast a signal from first sub assembly 102, second sub assembly 104, third sub assembly 106, and/or fourth sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by subterranean formation 204. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 204.

Figure 3:
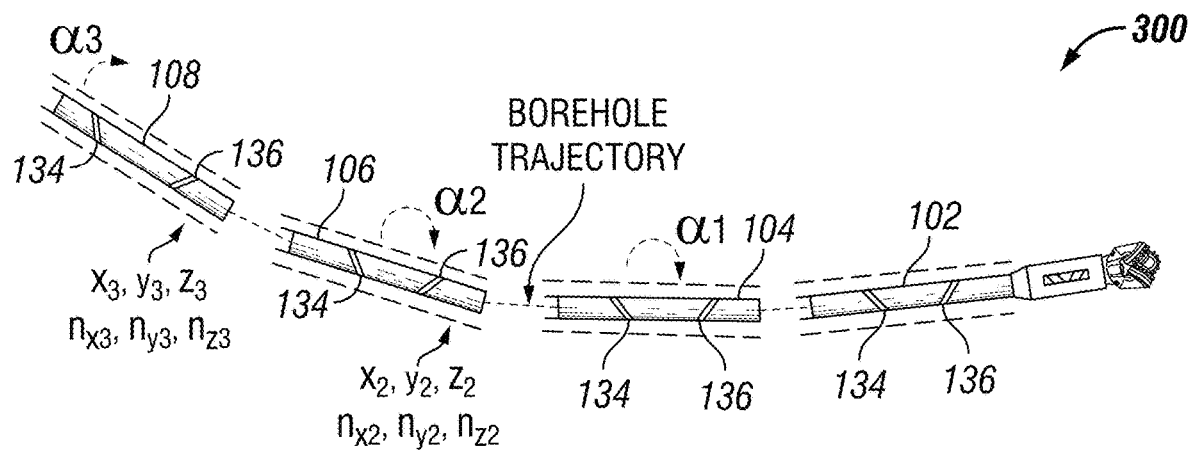
FIG. 3 illustrates an example of a logging tool.

As illustrated in FIG. 3, a logging tool 300 may include first sub assembly 102, second sub assembly 104, third sub assembly 106, and/or fourth sub assembly 108 (e.g., Referring to FIG. 1). As illustrated, longer spacing between transmitters 134 and/or receiver 136 between first sub assembly 102, second sub assembly 104, third sub assembly 106, and/or fourth sub assembly 108 may make it difficult to decouple multi-components from spaced antennas. Conventional methods use depth shifting or averaging to create pseudo-collate antennas, which may work accurately for traditional one sub resistivity tools, where there may not be an azimuth offset between transmitter 134 and receiver 136. However, when an azimuth offset may be between transmitter 134 and receiver 136, the conventional way to decouple multi-components becomes troublesome and inaccurate. For example, a ninety-degree azimuth offset between transmitter 134 and receiver 136 may lead to inaccurate measurements in the form of a singularity. As disclosed below, a method may be utilized to decouple multi-components from spaced antennas with any azimuth offset between transmitter 134 and receiver 136, and thus provides accurate and stable component signals as inputs for inversion calculations for any configurations of logging tool 300 or formation properties Logging tool 300 (e.g., Referring to FIG. 3) may include first sub assembly 102, second sub assembly 104, third sub assembly 106, and/or fourth sub assembly 108. For logging tool 300 with transmitter 134, which may be a tilted transmitter, and receiver 136 (normally LWD tool, e.g., referring to FIG. 2), or logging tool 300 with transmitter 134, which may be tri-axial, and receiver 136 (normally a conveyance, e.g., referring to FIG. 1), responses from first sub assembly 102, second sub assembly 104, third sub assembly 106, and/or fourth sub assembly 108 may be broken into the following components:

$$\begin{bmatrix} Z_{XX} & Z_{XY} & Z_{XZ} \\ Z_{YX} & Z_{YY} & Z_{YZ} \\ Z_{ZX} & Z_{ZY} & Z_{ZZ} \end{bmatrix} \quad (1)$$

where Z symbolizes mutual impedance which is complex number, $Z_{xx}$, $Z_{yy}$, $Z_{zz}$ are known as the direct-coupling components and $Z_{xy}$, $Z_{yx}$, $Z_{xz}$, $Z_{zx}$, $Z_{yz}$, $Z_{zy}$ are known as the cross-coupling components.

Figure 4:
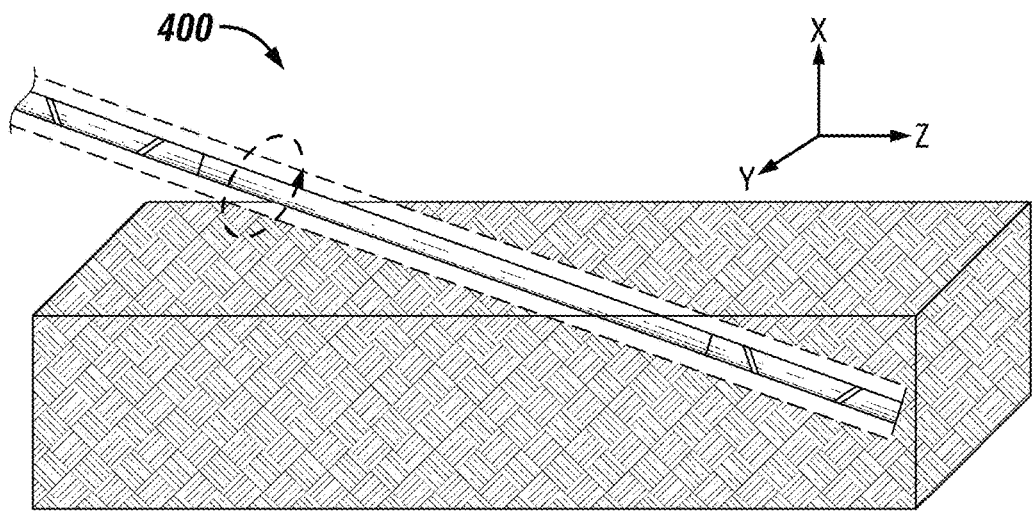
FIG. 4 illustrates an example of a logging tool in an orientation schematic.

Based on rotating model 400, as illustrated in FIG. 4, which may represent first sub assembly 102, second sub assembly 104, third sub assembly 106, and/or fourth sub assembly 108, any response from any transmitter 134 and receiver 136 combinations may be produced from the components:

$$Z_R(\beta) = \begin{bmatrix} \sin\theta_t\cos\beta \\ \sin\theta_t\sin\beta \\ \cos\theta_t \end{bmatrix}^T \begin{bmatrix} Z_{XX} & Z_{XY} & Z_{XZ} \\ Z_{YX} & Z_{YY} & Z_{YZ} \\ Z_{ZX} & Z_{ZY} & Z_{ZZ} \end{bmatrix} \begin{bmatrix} \sin\theta_r\cos(\beta+\beta_{ref}) \\ \sin\theta_r\sin(\beta+\beta_{ref}) \\ \cos\theta_r \end{bmatrix} \quad (2)$$

where $Z_R(\beta)$ is the response for a transmitter 134-receiver 136 pair at first sub assembly 102, second sub assembly 104, third sub assembly 106, and/or fourth sub assembly 108 bin azimuth, $\beta$ is first sub assembly 102, second sub assembly 104, third sub assembly 106, and/or fourth sub assembly 108 rotating azimuth, $\beta_{ref}$ is first sub assembly 102, second sub assembly 104, third sub assembly 106, and/or fourth sub assembly 108 face offset between transmitter 134 and receiver 136, $\theta_t$ is the tilt angle of transmitter 134, $\theta_r$ is the tilt angle of receiver 136.

Here, Equation (2) may be further written as the following form with a use curve fitting algorithm to obtain parameters $Z_A$, $Z_B$, $Z_C$, $Z_D$:

$$z_R(\beta') = Z_A \cos(2\beta' + \beta_{ref}) + Z_B \cos(\beta') + Z_C \sin(\beta') + Z_D \quad (3)$$

where $$\begin{cases} \beta' = \beta - \beta_{ref} \\ z_A = (C_{xx} - C_{yy})/2 \\ z_B = C_{xx}\cos\beta_{ref} + C_{xx} \\ z_C = -C_{xx}\sin\beta_{ref} \\ z_D = C_{zz} + (C_{xx} + C_{yy})\cos\beta_{ref}/2 \end{cases} \quad (4)$$

where $$\begin{cases} C_{xx} = Z_{xx}\sin\theta_t\sin\theta_r & c_{xx} = Z_{yx}\sin\theta_t\sin\theta_r & c_{xx} = Z_{zx}\cos\theta_t\sin\theta_r \\ C_{xy} = Z_{xy}\sin\theta_t\sin\theta_r & c_{xx} = Z_{yy}\sin\theta_t\sin\theta_r & c_{xx} = Z_{zy}\cos\theta_t\sin\theta_r \\ C_{xz} = Z_{xz}\sin\theta_t\cos\theta_r & c_{xx} = Z_{yz}\sin\theta_t\cos\theta_r & c_{xx} = Z_{zz}\cos\theta_t\cos\theta_r \end{cases} \quad (5)$$

As a result, two receivers 136 that are collocated for a transmitter 134, may calculate the components from the curve fitted signals as:

$$\begin{cases} Z_{AR1} = (Z_{xx}\sin\theta_t\sin\theta_{r1} - Z_{yy}\sin\theta_t\sin\theta_{r1})/2 \\ Z_{BR1} = Z_{zx}\cos\theta_t\sin\theta_{r1}\cos\beta_{ref1} + Z_{xz}\sin\theta_t\cos\theta_{r1} \\ Z_{CR1} = -Z_{zx}\cos\theta_t\sin\theta_{r1}\sin\beta_{ref1} \\ Z_{DR1} = Z_{zz}\cos\theta_t\cos\theta_{r1} + (Z_{xx}\sin\theta_t\sin\theta_{r1} + Z_{yy}\sin\theta_t\sin\theta_{r1})\cos\beta_{ref1}/2 \\ Z_{AR2} = (Z_{xx}\sin\theta_t\sin\theta_{r2} - Z_{yy}\sin\theta_t\sin\theta_{r2})/2 \\ Z_{BR2} = Z_{zx}\cos\theta_t\sin\theta_{r2}\cos\beta_{ref2} + Z_{xz}\sin\theta_t\cos\theta_{r1} \\ Z_{CR2} = -Z_{zx}\cos\theta_t\sin\theta_{r2}\sin\beta_{ref2} \\ Z_{DR2} = Z_{zz}\cos\theta_t\cos\theta_{r2} + (Z_{xx}\sin\theta_t\sin\theta_{r2} + Z_{yy}\sin\theta_t\sin\theta_{r2})\cos\beta_{ref2}/2 \end{cases} \rightarrow \begin{cases} z_{XX} \\ z_{yy} \\ z_{zz} \\ z_{Xz} \\ z_{zX} \end{cases} \quad (6)$$

To decouple air-hang component signals from the tool air-hang response, Equations (3) to (6) may be simplified as:

$$Z_{AIR} = Z_D \quad (7)$$

where $$Z_D = Z_{ZZ}\cos\theta_t\cos\theta_r + Z_{xx}\sin\theta_t\sin\theta_r\cos\beta_{ref} \quad (8)$$

Similarly, with two collocated coil receivers for the same transmitter, an operator may calculate the components from the air-hang response as:

$$\begin{cases} z_{DR1} = Z_{zz}\cos\theta_t\cos\theta_{r1} + Z_{xx}\sin\theta_t\sin\theta_{r1}\cos\beta_{ref1} \\ z_{DR2} = Z_{zz}\cos\theta_t\cos\theta_{r2} + Z_{xx}\sin\theta_t\sin\theta_{r2}\cos\beta_{ref2} \end{cases} \rightarrow \begin{cases} z_{zz} \\ z_{xx} \end{cases} \quad (9)$$

Figure 5:
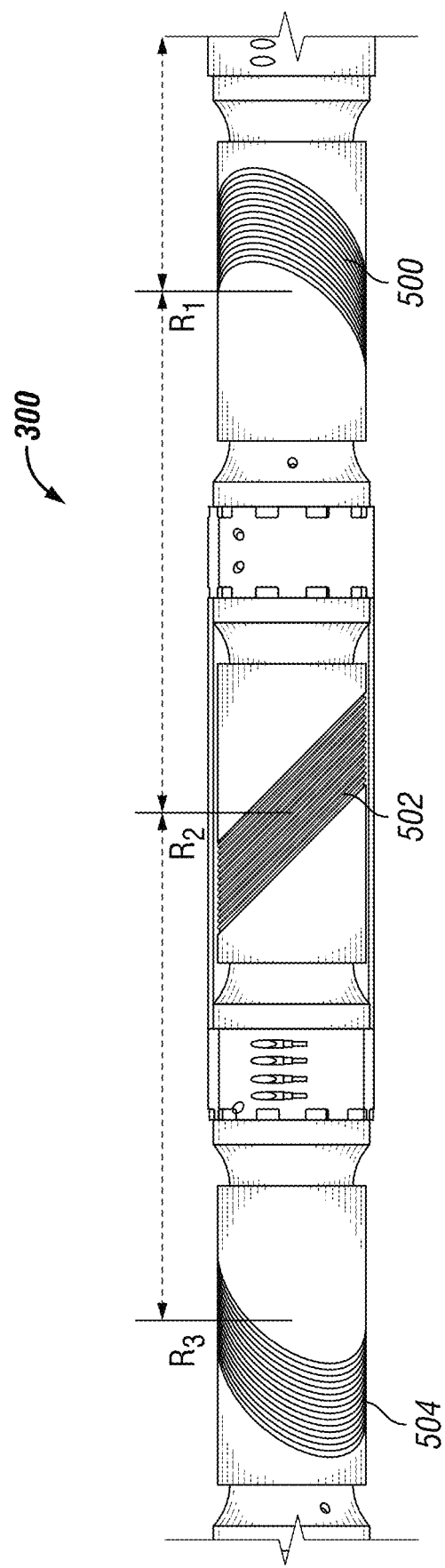
FIG. 5 illustrates an example sub assembly of the logging tool.

FIG. 5 illustrates at least a portion of a logging tool 300 (Referring to FIG. 3). Due to mechanical constraints and antenna interference considerations, logging tool 300 may include a first antenna 500, a second antenna 502, and a third antenna 504 within one sub module may be spaced apart instead of collocated together. First antenna 500, second antenna 502, and third antenna 504 may have one hundred- and twenty-degrees azimuth offset between them. Each antenna may transmit and/or receive signals. These signals may be processed in an inversion scheme to determine antenna 500, a second antenna 502, and a third antenna 504 within one sub module may be spaced apart instead of collocated together. First antenna 500, second antenna 502, and third antenna 504 may have one hundred- and twenty-degrees azimuth offset between them. Each antenna may transmit and/or receive signals. These signals may be processed in an inversion scheme to determine formation properties and/or boundaries. Before inversion schemes may be utilized to determine formation properties, record component signals of first antenna 500, second antenna 502, and third antenna 504 may be determined through decoupling.

FIGS. 6 and 7 illustrate a compact sub assembly 600, which may be first sub assembly 102, second sub assembly 104, third sub assembly 106, and/or fourth sub assembly 108 (e.g., referring to FIG. 1 or 2). In examples, compact sub assembly 600 may be about 20 feet to about 25 feet (about 6 meters to about 8 meters) long. Without limitation, a compact sub assembly 600 is about 1 ft. (about 0.3 meter) to about 25 ft. (about 8 meters) long. It should be noted that compact sub assembly 600 may include a variety of sensors disposed at different locations along compact sub assembly 600 with a range of distance between each sensor.

For example, a deep transmitter 602 may be disposed close, within about 30 feet (about 9 meters), to drill bit 218 (e.g., referring to FIG. 2). In examples, a shallow dual transmitter 604 (may be two parallel tilted coils) may be disposed next (from about 0 ft (0 meters) to about 10 ft (about 3 meters)) to a deep transmitter 602 (may be a single tilted coil), shallow dual-collocated receivers 606 (may be two cross tilted coils) may be disposed next (about 1 ft (about 1 meter) to about 8 ft (about 3 meters)) to shallow dual transmitters 604 (may be two parallel tilted coils), and a deep receiver 608 (may be two or three cross tilted coils) may be disposed on the opposite end (a distance between about 10 ft (about 3 meters) to about 40 ft (about 12 meters)) of compact sub assembly 600. It should be noted that deep receiver 608 may include a triaxial-collocated receiver 610 (e.g., referring to FIG. 6), or a dual-collocated receiver with clocking thread 612 (e.g., referring to FIG. 7). It should be noted that the threaded connection between two subs may be fixed at a desired angle instead of random angle. The arrangement of sensors on compact sub assembly 600, described above, may allow for compact sub assembly 600 to be approximately 30 feet (10 meters) in length.

Without limitation, deep transmitter 602 is a transmitter that operates at a frequency range of about 100 Hz to about 1 MHz and evaluates at least a portion of the formation from about 10 ft. (about 1 meters) to about 300 ft. (about 90 meters) from the wellbore. This length of evaluation is defined as deep measurements and deep receiver 608 may be used to measure signals that may be broadcasted from about 10 ft. (about 1 meters) to about 300 ft. (about 90 meters) from the wellbore. Without limitation, shallow dual-collocated receiver 606 is a receiver that operates to receive signals that are at a frequency range of about 1 kHz to about 10 MHz and evaluates at least a portion of the formation from about 0 ft. (0 meters) to about 50 ft. (about 15 meters) from the wellbore. Without limitation, shallow dual transmitter 604 is a transmitter that operates at a frequency range of about 1 kHz to about 10 MHz and evaluates at least a portion of the formation from about 0 ft. (0 meters) to about 50 ft. (about 15 meters) from the wellbore. Shallow, or fine resolution, is defined as evaluation of at least a portion of the formation from about 0 ft. (0 meters) to about 50 ft. (about 15 meters) from the wellbore.

In examples, deep transmitter 602 may function to provide deep measurement signal (wherein the deep measurement signal may be defined as a signal that is sensitive to deeper formation away from the wellbore) to decouple full H-field tensor from raw azimuthal measurements at the spacing between deep transmitter 602 and deep receiver 608 disposed on compact sub assembly 600. If another modularized sub with a deep receiver 608 is disposed at a larger distance (e.g. 100 ft spacing (30 meters)), then deep transmitter 603 may also provide a signal for deep receiver 608, which may be disposed on the modularized sub simultaneously.

Shallow dual transmitter 604 may include one or more tilted transmitters 614, which may be spaced apart (about 2 inches (about 5 centimeters) to about 20 inches (about 50 centimeters)) for shallow-depth measurement. The distance between each tilted transmitter 614 may allow an operator to measure ratio signals between tilted transmitters 614, which may reduce the direct coupled signal from shallow dual transmitter 604 to shallow dual-collocated receivers 606. Without limitation, measuring ratio signals between tilted transmitter 614 may also reduce collar effects and reduce borehole effects that may be measured by compact sub assembly 600.

As illustrated, shallow dual-collocated receivers 606 may include one or more collocated receivers 616, which may allow shallow dual-collocated receivers 606 to receive shallow-depth signals from shallow dual transmitter 604. Each collocated receiver 616 may be an antenna, a coil, and/or the like. Without limitation, each collocated receiver 616 may be disposed at a tilt of about 45 degrees in any direction and may be azimuthally 180 degree apart, which may allow each collocated receiver 616 to be orthogonal to each other with minimum cross-talk (i.e., coupling between coils). Each collocated receiver 616 may include a receiver coil antenna, which may have between about 5 to 10 turns. Additionally, shallow dual-collocated receivers 606 may include a shield slot cut (not illustrated), which may trace each collocated receiver 616. It should be noted that the shield slot cut may be perpendicular to each collocated receiver 616.

Without limitation, shallow dual-collocated receivers 606 may function in such a manner as to allow an operator to decouple a full H-field tensor from raw azimuthal measurements from a short spacing (about 1 ft (about 1 meter) to about 8 ft (about 3 meters)). Once a full H-field tensor is measured, anisotropy measurements and formation dip measurements may be inverted with in a very fine scale.

As illustrated in FIGS. 6 and 7, compact sub assembly 600 may include deep receivers 608 (e.g., referring to FIG. 7) or triaxial-collocated receivers 610 (e.g., referring to FIG. 6). Without limitation, deep receivers 608 may be dual collocated receivers, an antenna, coil, and/or the like. Each antenna may tilt at about 45 degrees in any direction and each antenna may be azimuthally 180 degrees apart. In examples, each deep-dual collocated receiver may be a coil antenna which may have about 15 to 40 turns. Additionally, as discussed above, a clocking thread may be disposed about 45 degrees in any direction. This may allow deep receivers 608 to provide full H-filed tensor from a deeper spacing, for example, about 20 feet to about 25 feet (about 6 meters to about 8 meters). It should be noted that a clocking thread, during operations, may function to avoid "blind spots" for decoupling H-field full tensors. During operations, "blind spots" may occur as deep receivers 608 may be threaded at the opposite end of compact sub assembly 600. This may be due to deep receivers 608 having an azimuth angle that may be an offset to deep transmitter 602 by about 90 degrees. It should be noted that measurements may not decouple a full tensor out of the raw azimuthal measurements.

In examples, triaxial-collocated receivers 610 (e.g., referring to FIG. 6) may also provide full H-field tensor from a deeper spacing, for example, about 20 feet to about 25 feet (about 6 meters to about 8 meters). Without limitation, triaxial-collocated receivers 610 may be antennas, coils, and/or the like. In examples, each triaxial-collocated receiver 610 may tilt at about 54.7 degrees and each may be azimuthally 120 degrees apart, so that in 3D (three-dimensional) space, each triaxial-collocated receiver 610 may be orthogonal to each other. It should be noted, as coils, each triaxial-collocated receiver 610 may have about 15 to 40 turns. Additionally, it should be noted that deep receiver 608, as noted above, may include shield slot cuts (not illustrated) which may trace each triaxial-collocated receiver 610. In examples, the shield slot cuts may be perpendicular to each triaxial-collocated receiver 610.

During operation, compact sub assembly 600, with the configuration of sensors described above, may provide about 60 feet (18 meters) of "look around" (measure and interpret formation around the wellbore) and "look ahead" (measure and interpret formation ahead of drill bit 218) depth of investigation for well measurement system 100. Compact sub assembly 600 may take measurements that may allow for refined resolution for inverted shallow formation layers because compact sub assembly 600 provides electromagnetic measurements with shorter spacings and higher frequencies. Additionally, compact sub assembly 600 may provide convention logging while drilling resistivity measurements and may provide anisotropy and dip measurements that may be accurate on a fine scale because compact sub assembly 600 provides electromagnetic measurements with shorter spacings and higher frequencies. Utilizing compact sub assembly 600 for first sub assembly 102, second sub assembly 104, third sub assembly 106, and/or fourth sub assembly 108, may allow for well measurement system 100 to provide "look around" and "look ahead" depth of investigation of about 200 feet (60 meters).

Without limitation, an information handling system 120 (e.g., referring got FIGS. 1 and 2) may be disposed downhole on compact sub assembly 600 (e.g., referring to FIG. 6). In examples, information handling system 120 may control deep transmitter 602, shallow dual transmitter 604, shallow dual-collocated receivers 606, and deep receiver 608 (e.g., referring to FIG. 6) by any suitable means. This may allow for antennas and/or coils to be excited for transmission of signals from a transmitter and allow for the antennas and/or the coils to receive, measure, and/or record signals by receivers.

FIGS. 8 through 11 are graphs of horizontal resistivity measurements, anisotropy measurements, formation dip measurements, and of inversion misfit measurements of compact sub assembly 600 (e.g., referring to FIG. 6), respectively. FIGS. 8-10 are graphs of shallow measurements that have been inverted and show measurements of a shallow layer accurately in a very fine scale. These inverted shallow features may allow for constraining upper layers for a look ahead inversion, which may enable the look ahead inversion to measure and determine the type of formation that may be in front of drill bit 218 (e.g., referring to FIG. 2). Determining the type of formation in front of drill bit 218 may allow an operator to steer drill bit 218, and in turn drill string 212 (e.g., referring to FIG. 2), through subterranean formation 204 (e.g., referring to FIG. 2).

Figure 12:
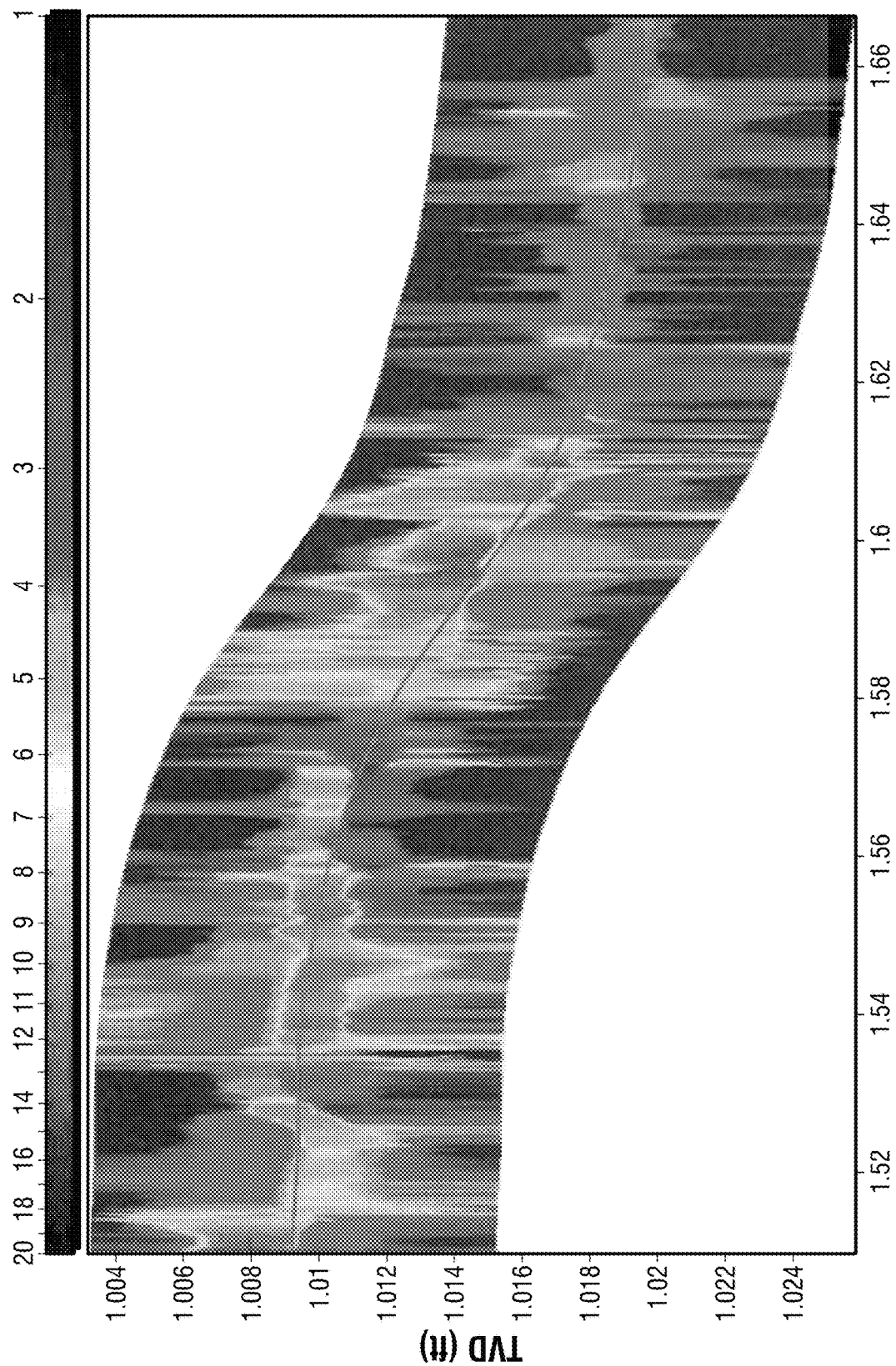
FIG. 12 is another example graph of resistivity measurement.

FIG. 12 is a graph of resistivity measurements taken by compact sub assembly 600 (e.g., referring to FIG. 6) with about 25 feet (about 8 meters) of spacing for inversion only. As illustrated in the graph, the spacing may allow for about 50 feet (15 meters) of depth for investigation. This demonstrate the capability of compact sub assembly 600 to provide regular depth-of-investigation during drilling operations with only one compact sub assembly 600.

This method and system may include any of the various features of the compositions, methods, and system disclosed herein, including one or more of the following statements.

Statement 1: A compact sub assembly may comprise a deep transmitter disposed about one end of the compact sub assembly; a shallow dual transmitter disposed on the compact sub assembly between the deep transmitter and a second end of the compact sub assembly; a shallow dual-collocated receiver disposed on the compact sub assembly between the deep transmitter and a second end of the compact sub assembly; and a deep receiver disposed about the second end of the compact sub assembly.

Statement 2. The compact sub assembly of statement 1, further comprising an information handling system, wherein the information handling system is disposed within the compact sub assembly.

Statement 3. The compact sub assembly of statement 2, wherein the information handling system controls, the deep transmitter, the shallow dual transmitter, the shallow collocated receiver and the deep receiver.

Statement 4. The compact sub assembly of statements 1 or 2, wherein the deep receiver further comprises a triaxial-collocated receiver.

Statement 5. The compact sub assembly of statements 1, 2, or 4, wherein the deep receiver further comprises a dual-collocated receiver and a clocking thread.

Statement 6. The compact sub assembly of statement 5, wherein the clocking thread is disposed at the deep receiver at about an angle of 45 degrees in any direction.

Statement 7. The compact sub assembly of statements 1, 2, 4, or 5, wherein the shallow dual-collocated receiver includes one or more collocated receivers.

Statement 8. The compact sub assembly of statement 7, further comprising a shield slot cut in the shallow dual-collocated receiver, wherein the one or more collocated receivers are perpendicular to the shield slot cut.

Statement 9. The compact sub assembly of statements 1, 2, 4, 5, or 7, wherein the shallow dual transmitter includes one or more tilted transmitters.

Statement 10. The compact sub assembly of statements 1, 2, 4, 5, 7, or 9, wherein the compact sub assembly is about 15 feet to about 40 feet in length.

Statement 11. A well measurement system for decoupling a component signal may comprise a logging tool, wherein the logging tool includes a first sub assembly, wherein the first sub assembly is a compact sub assembly and the compact sub assembly includes a deep transmitter disposed about one end of the compact sub assembly; a shallow dual transmitter disposed on the compact sub assembly between the deep transmitter and a second end of the compact sub assembly; a shallow dual-collocated receiver disposed on the compact sub assembly between the deep transmitter and a second end of the compact sub assembly; and a deep receiver disposed about the second end of the compact sub assembly; and a conveyance, wherein the conveyance is attached to the logging tool.

Statement 12. The well measurement system of statement 11, wherein the logging tool comprises one or more sub-assemblies and each sub assembly is one or more compact sub-assemblies.

Statement 13. The well measurement system of statements 11 or 12, further comprising an information handling system, wherein the information handling system is disposed within the compact sub assembly.

Statement 14. The well measurement system of statement 13, wherein the information handling system controls, the deep transmitter, the shallow dual transmitter, the shallow dual-collocated receiver, and the deep receiver.

Statement 15. The well measurement system of statements 11, 12, or 14, wherein the deep receiver further comprises a triaxial-collocated receiver.

Statement 16. The well measurement system of statements 11, 12, 13, or 14, wherein the deep receiver further comprises a dual-collocated receiver and a clocking thread.

Statement 17. The well measurement system of statement 16, wherein the clocking thread is disposed at the deep receiver at about an angle of 45 degree in any direction.

Statement 18. The well measurement system of statements 11, 12, 13, 14, or 16, wherein the shallow dual-collocated receiver includes one or more collocated receivers.

Statement 19. The well measurement system of statement 18, further comprising a shield slot cut in the shallow dual-collocated receiver, wherein the one or more collocated receivers are perpendicular to the shield slot cut.

Statement 20. The well measurement system of statements 11, 12, 13, 14, 16, or 18, wherein the compact sub assembly is about 15 feet to about 40 feet in length.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A compact sub assembly comprising:
a single mandrel;
a deep receiver disposed on the single mandrel and about a first end of the single mandrel;
a deep transmitter disposed on the single mandrel and about a second end of the single mandrel, wherein the deep receiver and the deep transmitter transmit and measure a first full H-field tensor;
a shallow dual transmitter disposed on the single mandrel and between the deep transmitter and the first end of the single mandrel; and
a shallow dual-collocated receiver disposed on the single mandrel and between the deep transmitter and the first end of the single mandrel, wherein the shallow dual-collocated receiver and the shallow dual transmitter transmit and measure a second full H-field tensor that is decoupled from the first full H-field tensor.

2. The compact sub assembly of claim 1, further comprising an information handling system, wherein the information handling system is disposed within the compact sub assembly.

3. The compact sub assembly of claim 2, wherein the information handling system controls, the deep transmitter, the shallow dual transmitter, the shallow collocated receiver and the deep receiver.

4. The compact sub assembly of claim 1, wherein the deep receiver further comprises a triaxial-collocated receiver.

5. The compact sub assembly of claim 1, wherein the deep receiver further comprises a dual-collocated receiver and a clocking thread.

6. The compact sub assembly of claim 5, wherein the clocking thread is disposed at the deep receiver at about an angle of 45 degrees in any direction.

7. The compact sub assembly of claim 1, wherein the shallow dual-collocated receiver includes one or more collocated receivers.

8. The compact sub assembly of claim 7, further comprising a shield slot cut in the shallow dual-collocated receiver, wherein the one or more collocated receivers are perpendicular to the shield slot cut.

9. The compact sub assembly of claim 1, wherein the shallow dual transmitter includes one or more tilted transmitters.

10. The compact sub assembly of claim 1, wherein the compact sub assembly is about 15 feet to about 40 feet in length.

11. A well measurement system for decoupling a component signal comprising:
a logging tool, wherein the logging tool includes: a first sub assembly, wherein the first sub assembly is a compact sub assembly and the compact sub assembly includes:
a single mandrel;
a deep receiver disposed on the single mandrel and about a first end of the single mandrel;
a deep transmitter disposed on the single mandrel and about a second end of the single mandrel wherein the deep receiver and the deep transmitter transmit and measure a first full H-field tensor;
a shallow dual transmitter disposed on the single mandrel and between the deep transmitter and the first end of the single mandrel;
a shallow dual-collocated receiver disposed on the single mandrel and between the deep transmitter and the first end of the single mandrel wherein the shallow dual-collocated receiver and the shallow dual transmitter transmit and measure a second full H-field tensor that is decoupled from the first full H-field tensor; and
a conveyance, wherein the conveyance is attached to the logging tool.

12. The well measurement system of claim 11, wherein the logging tool comprises one or more sub-assemblies and each sub assembly is one or more compact sub-assemblies.

13. The well measurement system of claim 11, further comprising an information handling system, wherein the information handling system is disposed within the compact sub assembly.

14. The well measurement system of claim 13, wherein the information handling system controls, the deep transmitter, the shallow dual transmitter, the shallow dual-collocated receiver, and the deep receiver.

15. The well measurement system of claim 11, wherein the deep receiver further comprises a triaxial-collocated receiver.

16. The well measurement system of claim 11, wherein the deep receiver further comprises a dual-collocated receiver and a clocking thread.

17. The well measurement system of claim 16, wherein the clocking thread is disposed at the deep receiver at about an angle of 45 degree in any direction.

18. The well measurement system of claim 11, wherein the shallow dual-collocated receiver includes one or more collocated receivers.

19. The well measurement system of claim 18, further comprising a shield slot cut in the shallow dual-collocated receiver, wherein the one or more collocated receivers are perpendicular to the shield slot cut.

20. The well measurement system of claim 11, wherein the compact sub assembly is about 15 feet to about 40 feet in length.

* * * * *